United States Patent [19]

Hauber

[11] 4,143,556

[45] Mar. 13, 1979

[54] MOTORIZED VENT OPERATOR

[76] Inventor: Peter F. Hauber, 7846 Shady Spring Dr., Burbank, Calif. 91504

[21] Appl. No.: 878,407

[22] Filed: Feb. 16, 1978

[51] Int. Cl.[2] ........................ F16H 21/16; E05F 11/00; E05F 11/24; E05F 11/36

[52] U.S. Cl. ........................................ 74/25; 49/324; 49/342; 49/354

[58] Field of Search ........................ 74/25; 49/350, 349, 49/354, 324, 342

[56] References Cited

U.S. PATENT DOCUMENTS

| | | | |
|---|---|---|---|
| 1,939,245 | 12/1933 | Ackerman et al. | 49/350 X |
| 3,659,466 | 5/1972 | Pickles | 74/89.18 |
| 3,706,236 | 12/1972 | Pickles | 49/349 X |
| 3,715,931 | 2/1973 | Littman | 74/411 |
| 3,770,313 | 11/1973 | Jimenez | 49/349 X |
| 4,068,408 | 1/1978 | Hauber | 49/324 |

*Primary Examiner*—Leonard H. Gerin
*Attorney, Agent, or Firm*—John E. Wagner

[57] ABSTRACT

An improved vent operator for controlling the position of an edge opening vent in the roof of a recreational vehicle or the like is disclosed. The vent operator is coupled to an electric motor, manual jamb or crank or the like, and comprises a set of reduction gears and drives two sector arms which raise or lower the vent cover. The gear reduction is accomplished by spur gears which have good mechanical properties. The cost of the entire apparatus is minimized by making the gears from pressed metal, the sector arms from stampings and the housing from castings. The result is a reliable vent operator that can be produced economically in commercial quantities.

5 Claims, 6 Drawing Figures

MOTORIZED VENT OPERATOR

BACKGROUND OF THE INVENTION

In recreational vehicles it is commmon to have a vent in the roof which is hinged at the front or rear and elevated at the opposite edge by means of an arm or arms connected between the vent cover and the roof structure of the vehicle. The forces on such a vent are significant, considering that the vent is intended to be held open even at highway speeds, and may have an area of three square feet or more. In some installations a single arm is used to brace the vent in its open position, but for larger sizes, a two arm mechanism is required.

A prior art vent operator is described in U.S. Pat. No. 4,068,408 by Peter Hauber. This patent describes the mechanical details of a roof-mounted vent and a two arm vent operator for the reliable adjustment of said vent cover, and is incorporated herein by reference.

The patented device employs a pair of operator arms, each having at their inner ends a sector gear which mates with a common helical gear secured within the operator body. An overlying plate transfers load from the operator body to the recreational vehicle roof. This vent operator, including the flexible operator arms as described therein, combines good mechanical integrity and vibration damping characteristics. However, there is always a need for alternatives of lower cost and improved mechanical characteristics.

Prior art window and vent operating devices are described in U.S. Pat. Nos. 2,801,845, 2,674,452, 2,777,687, 2,774,591, 2,022,036, 3,846,938, 2,699,232, and 2,635,485. In all cases, a helical gear is used to drive the sector arms, but helical gears have several inherent problems. First, a helical gear is difficult to fabricate in that the production of an accurate gear often requires a complex machining process. This is reflected in a higher cost for helical gears. Of course, the gear may be produced by a cheaper method, but then gear accuracy and performance are impaired. Second, spur gears, in comparison to helical gears, have better load resistance characteristics. To use the vent operator apparatus as an example, a wind force felt against the vent is translated into a force felt at the gear assembly as exerted through the sector arms. In a spur gear, this force bears on a flat spur gear tooth surface at a right angle. There is a minimum of slippage. In a helical gear, however, the force is felt at an angle to the tooth surfaces, resulting in lateral forces and slippage.

A third advantage of spur gears over helical or worm gears is the reduced tendency to jam. The forces between spur gear teeth are always at right angles between flat opposed surfaces, maintaining freedom of movement. In worm gears, there is a wedge action resulting in a sliding of teeth surfaces under pressure, resulting in lateral forces and a tendency to jam.

One reason for the limited use of spur gears in vent operators is the greater cost associated with a higher parts count. A number of reduction spur gears would be needed to replace a single helical gear. Since spur gears are usually machined, the added cost of spur gears has prevented their use.

What is needed in the industry is a vent operator comprising spur reduction gears between a driven shaft and the sector arms that can be manufactured economically in commercial quantities.

Additional economies might also be achieved and more attractive assembly result if the additional volume required by the helical gear to achieve speed reduction and mechanical advantage could be accomplished with spur gears.

SUMMARY OF THE INVENTION

The described embodiment comprises a set of spur reduction gears driving two sector arms. Cost is reduced by using pressed metal spur gears which combine high precision, good mechanical strength and low cost. The sector arms are produced in a stamping operation which forms the arms, mounting holes for attachment to the vent cover hardware, and gear teeth in one operation. Finally, the two halves of the housing are castings which are pressed together to form an enclosure in which the position of the axes of rotation of the various gears and arms are maintained. The housing also comprises brackets for attachment to the vehicle roof. The resultant apparatus has good structural integrity and is producible in commercial quantities at low cost.

More specifically, the apparatus comprises a small diameter driven spur gear, a small diameter idler spur gear which meshes with the driven gear, and two outer gears each having a large diameter set of outer teeth and a concentric small diameter set of inner teeth. The outer teeth of one outer gear meshes with the driven gear, and the outer teeth of the second outer gear mesh with the idler gear. The two sector arms are formed so that the lower section comprises a large diameter spur gear which meshes with the small diameter set of inner teeth of each outer gear. All of these components are confined in a housing comprising forward and rear portions connected to shafts about which the sector arms, driven gear, idler gear and outer gears rotate.

The driven gear and idler gears are made of pressed metal integrally with their shafts in the described embodiments, while the sector arm and outer gear shafts are integrally formed as a part of the forward housing casting.

In operation, the driven gear and the idler gear are rotated by a motor or equivalent which, because of the coupling, drives the outer gears and sector arms in opposite directions. As the sector arms spread, the vent closes. Alternatively, as the sector arms come together, the vent opens. The result is a low cost and reliable vent operator for recreational vehicles. Additionally, the overall volume and particularly the depth of the assembly is reduced.

BRIEF DESCRIPTION OF THE DRAWINGS

This invention may be more clearly understood from the following detailed description and by reference to the drawings in which.

DETAILED DESCRIPTION OF THE INVENTION

Figure 1:
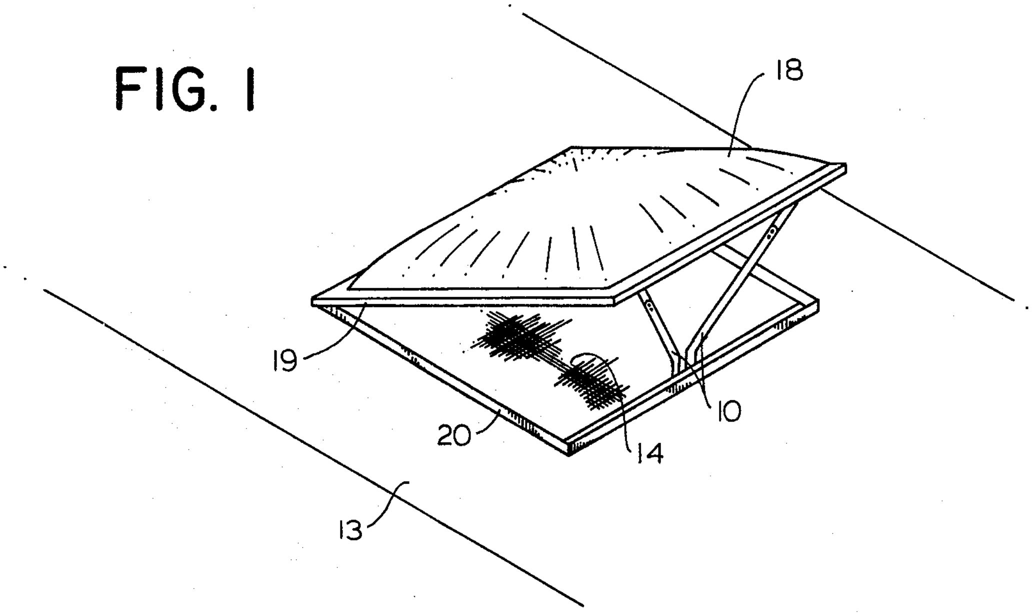
FIG. 1 is a fragmentary perspective view of a recreational vehicle roof with the vent open.

As indicated above, this invention is directed principally to operators of roof vents for recreational vehicles and the like in which the vent is of substantial size, for example, three square feet or greater. In FIG. 1, a recreational vehicle roof 13 is shown having a vent 14 which is covered by a hinged vent cover 18. The vent cover 18 is slightly domed and includes a skirt 19 which encloses an upstanding lip 20 in the roof 13. When in the down or closed position, the cover 18 seals the vent 14 from ingress of either moisture or dust while allowing subdued lighting of the interior in the case where the cover 18 is translucent.

As shown in FIG. 1, a pair of sector arms or operator arms 10 connect the cover 18 and the roof 13. As these arms 10 are spread, the cover 18 lowers, and as the arms are brought together, the cover 18 is raised. These arms are driven by a roof-mounted vent operator, to be described below.

Figure 2:
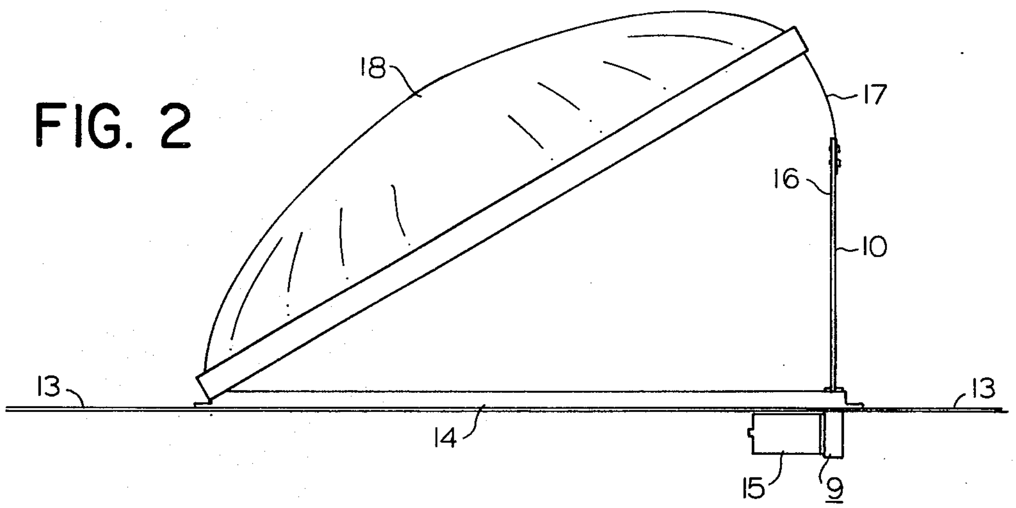
FIG. 2 is a side view of the open vent.

The spatial relationship between the vent operator 9, the vehicle roof 13 and the cover 18, in its open position, are shown in FIG. 2. A motor 15 drives the vent operator 9 in the preferred embodiment but a hand driven knob or any other equivalent could be used to produce a rotation of a drive shaft in the vent operator 9. An internal set of reduction gears couples this rotation to the sector arms 10 which travel in arcuate paths about an axis parallel to the plane of FIG. 1. As the sector arms 10 spread, the cover 18 closes and as the sector arms 10 come together the cover 18 is raised. The sector arms in this embodiment comprise a rigid member 16 and a flexible member 17 coupled to the vent cover 18 by a set of rollers riding in a groove. However, these details are now shown, and any equivalent would be acceptable.

Figure 3:
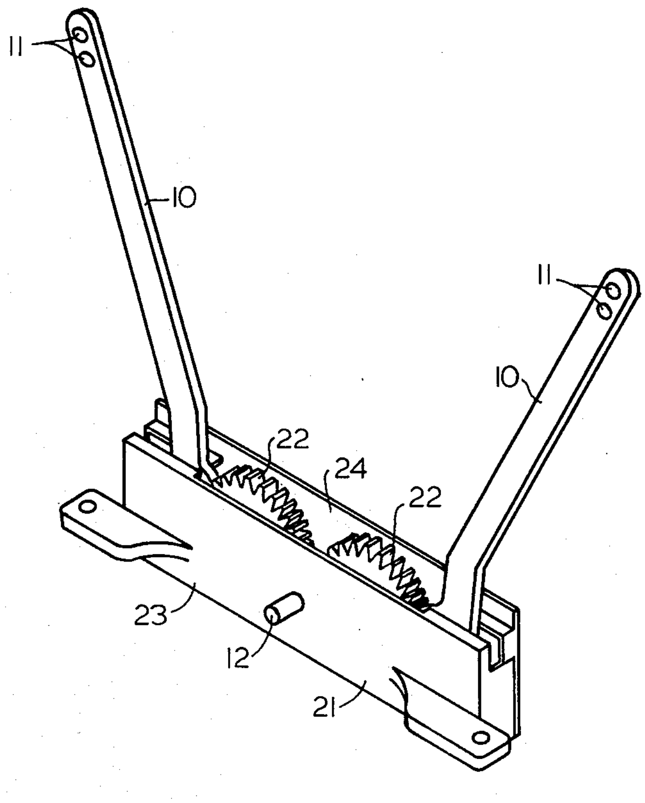
FIG. 3 is an isometric view of the vent operator.

An isometric view of the entire vent operator 9 apparatus is shown in FIG. 3. The two sector arms 10 connect the vent operator 9 to the vent by means of holes 11 in which rollers or equivalent hardware are mounted. The bottom of the sector arms are restrained by and rotate around shafts, not shown in FIG. 3, because the bearing sockets do not extend through the housing 21 surface shown.

The sector arms are driven by rotating the drive shaft 12. This shaft 12 is coupled through reduction spur gears to the sector arms 10. Only the outer gears 22 are shown in FIG. 3.

The housing 21 has a forward portion 23, through which the drive shaft 12 protrudes, and a rear portion 24 which are pressed together. As will be described in more detail below, the portions 23, 24 are connected at five points by shaft-like extensions which protrude rearwardly from the rear surface of the forward portion 23 and mate with associated holes in the rear portion 24. After assembly, the shaft ends protrude from the rear surface of the rear portion 24 and are expanded, locking the portions 23, 24 together.

The housing portions 23, 24 are molded and machined. The forward portion 23 further includes integral mounting brackets 25 for mounting onto the vehicle roof 13.

Figure 4:
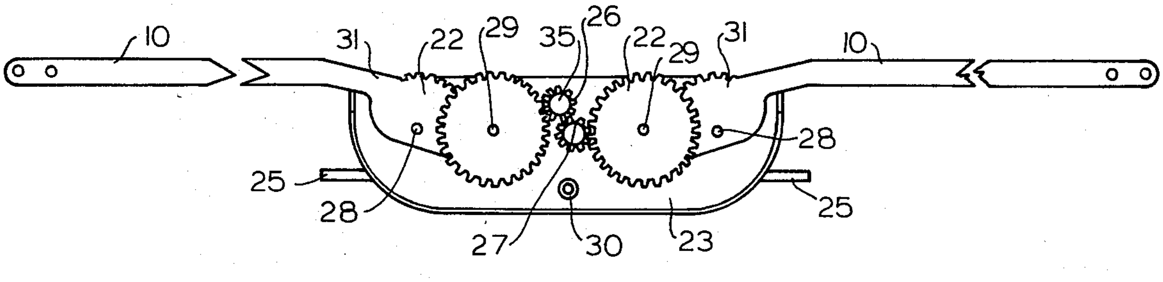
FIG. 4 is a rear view of the vent operator with the rear half of the housing removed.

FIG. 4 is a rear view of the housing forward portion 23 and shows the positional relationship of the sector arms 10, the outer gears 22, the idler gear 26, the idler shaft 35 on which the idler gear 26 is formed as an integral part, and the drive gear 27.

The forward portion 23 of the housing is cast to include two sector arm shafts 28 about which the sector arms 10 rotate, and two outer gear shaft 29 about which the outer gears 22 rotate. These four shafts 28, 29 have forward large diameter sections about which the sector arms 10 and outer gears 22 rotate, and are then stepped down at the rear end to a narrow diameter portion. Upon assembly, the rear portion of the housing, containing narrow diameter holes, is forced down onto the shafts 28, 29 to the steps. The shaft ends protruding from the rear surface of the rear portion 24 are then expanded to lock the housing 21 portions together. A fifth shaft 30 is supplied in the preferred embodiment to provide an additional connecting point between housing 21 portions.

The driven gear 27 is preferably made an integral part of the driven shaft 12 from pressed metal, said shaft 12 extending through a hole drilled in the forward portion 23. The rear of the driven gear is also a short shaft mating with an associated drilled bearing surface in the rear half 24. Similarly, the idler gear 26 has two short shafts mating with associated bearing surfaces in forward 23 and rear 24 portions.

Figure 5:
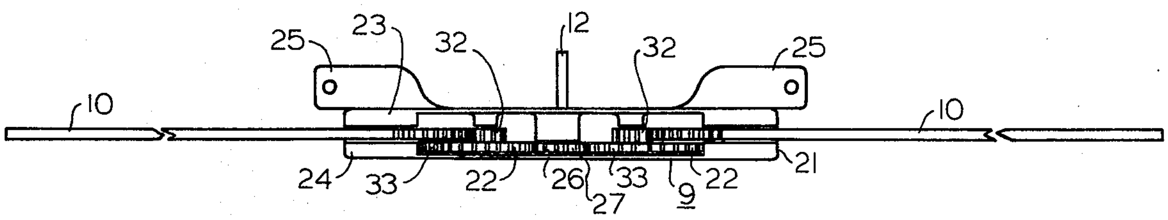
FIG. 5 is a top view of the vent operator.

FIG. 5 is a top view of the vent operator 9 showing the working arrangements of the reduction gearing in relation to the driven shaft 12 and the sector arms 10 after the forward portion 23 and the rear portion 24 of the housing 21 are locked together. The driven shaft 12 is integral with and drives the driven gear 27. This driven gear 27 is located below the idler gear 26 and meshes with it, so that these idler 26 and driven 27 gears rotate in opposite directions. The idler 26 and driven 27 gears are offset, each to contact one outer gear 22, so that each outer gear 22 is driven in an opposite direction.

The sector arm teeth 31 mesh with the inner teeth 32 of each outer gear 22, the inner 32 and outer 33 teeth of each outer gear 22 providing the necessary gear reduction, 16-1 in the described embodiment, between driven shaft 12 and sector arm 10 rotations.

Figure 6:
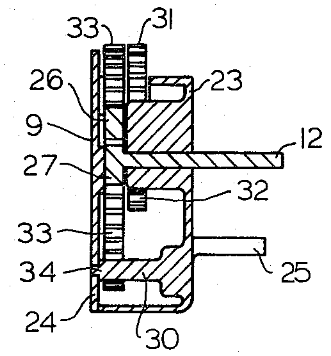
FIG. 6 is a cutaway side view of said vent operator.

FIG. 6 is a sectional view of the vent operator 9. The driven shaft 12 extends through the forward portion 23 and is an integral part of the driven gear 27. Behind the driven gear 27, the outer teeth 33 and the inner teeth 32 of the outer gear 22 are visible. Meshing with the inner teeth 32 are the sector arm teeth 31. The rear portion 24 is forced against the step 34 of all shafts including the fifth shaft 30 and the rear end of these shafts are then expanded to lock the forward 23 and rear 24 portions together. The bracket 25 for mounting on the roof 13 completes the mechanism.

It can now be seen that this described apparatus satisfies all of the objectives described above. The parts are all adapted to be economically manufactured in commercial quantities. The housing portions 23, 24 are cast and drilled, the sector arms 10, which are identical but inverted, are stamped during assembly and the gears 22, 26, 27 are pressed metal. Also, the assembly is simple, consisting of placing all the parts in the forward portion 23, pressing the rear portion 24 thereon, and expanding the rivet-like end projections of five shafts.

Finally, the complete mechanism has good structural and operational characteristics since it accomplishes its gear reduction function through the use of spur gears.

The above described embodiments of this invention are merely descriptive of its principles and are not to be considered limiting. The scope of this invention instead shall be determined from the scope of the following claims, including their equivalents.

What is claimed is:

1. A vent operator comprising:

a housing comprising foward and rear portions;

a plurality of shafts, said housing mounting said shafts between said forward and rear portions in generally parallel relationship;

a driven spur gear on one of said shafts;

an idler spur gear on a second of said shafts in meshing contact with said driven gear;

two outer spur gears on respective shafts, each having a set of outer teeth and a concentric spur gear including a set of smaller diameter teeth, the outer teeth of one outer gear meshing with said driven spur gear and the outer teeth of the other outer gear meshing with said idler gear; and two sector arms, each mounted on respective shafts, one end of each sector arm comprising a spur gear meshing with the set of smaller diameter teeth of each outer spur gear;

said housing defining at least one opening through which said sector arms extend out of said housing for arcuate movement responsive to rotation of said driven spur gear.

2. The apparatus of claim 1 wherein said driven gear, said idler gear and said outer gears are formed from pressed metal.

3. The apparatus of claim 2 wherein said sector arms are stampings.

4. The apparatus of claim 3 wherein said housing forward and rear portions are castings.

5. A vent operator comprising:

a housing comprising forward and rear portions;

an integral driven gear and driven shaft;

an integral idler gear and idler shaft;

two outer gear shafts; and two sector arm gear shafts;

wherein said shafts are mounted between said housing forward and rear portions in parallel;

an outer gear mounted on each outer gear shaft comprising a set of outer teeth and a concentric smaller diameter spur gear; and a sector arm comprising a sector arm gear which is mounted on each sector arm shaft;

wherein all of said shafts are positioned between said housing portions to mesh the driven gear with the idler gear and the outer teeth of one outer gear, the idler gear with the outer teeth of the other outer gear, and each sector arm gear with the smaller diameter spur gear of an outer gear.

* * * * *